United States Patent
Wen et al.

(10) Patent No.: US 8,917,987 B2
(45) Date of Patent: Dec. 23, 2014

(54) METHOD AND APPARATUS FOR DETECTING BRANCH FIBERS, AND PASSIVE OPTICAL NETWORK

(75) Inventors: Yunsheng Wen, Shenzhen (CN); Jun Zhao, Shenzhen (CN); Shijun Wang, Shenzhen (CN); Xiaolei Shan, Shenzhen (CN); Bo Wang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 266 days.

(21) Appl. No.: 13/529,457

(22) Filed: Jun. 21, 2012

(65) Prior Publication Data

US 2012/0263458 A1    Oct. 18, 2012

Related U.S. Application Data

(63) Continuation of application No. PCT/CN2011/073355, filed on Apr. 27, 2011.

(30) Foreign Application Priority Data

May 11, 2010    (CN) .......................... 2010 1 0170195

(51) Int. Cl.
*H04B 10/08* (2006.01)
*H04B 10/071* (2013.01)

(52) U.S. Cl.
CPC .................................. *H04B 10/071* (2013.01)
USPC .................................. 398/16; 398/21; 398/34

(58) Field of Classification Search
CPC ............. H04B 10/071; H04B 10/0795; H04B 10/07953; H04B 17/0085
USPC ........................................ 398/16, 21, 24, 34
See application file for complete search history.

(56) References Cited

U.S. PATENT DOCUMENTS

| | | | |
|---|---|---|---|
| 5,506,674 | A | 4/1996 | Inoue et al. |
| 6,009,220 | A | 12/1999 | Chan et al. |
| 6,396,575 | B1 | 5/2002 | Holland |
| 7,321,730 | B2 | 1/2008 | Felske et al. |
| 2006/0110161 | A1 | 5/2006 | Cho et al. |
| 2009/0263123 | A1* | 10/2009 | Zhu et al. ........................ 398/16 |

(Continued)

FOREIGN PATENT DOCUMENTS

| | | |
|---|---|---|
| CN | 1082717 | 2/1994 |
| CN | 1089414 | 7/1994 |

(Continued)

OTHER PUBLICATIONS

Partial translation of Office Action dated Jun. 28, 2013 in connection with Chinese Patent Application No. 201010170195.6.

(Continued)

*Primary Examiner* — Dzung Tran (57) ABSTRACT

A method for detecting branch fibers is provided, which includes: sending test signals to a plurality of branch fibers, where the test signals are added at ports of the optical splitting module with identification information for identifying branch fibers connected to the ports and receiving a reflection signal added with the identification information of a detected branch fiber, identifying the detected branch fiber corresponding to the reflection signal through detecting the identification information added to the reflection information, and obtaining channel characteristics of the detected branch fiber according to the reflection signal. Further, a system and an apparatus for detecting branch fibers are provided.

12 Claims, 4 Drawing Sheets

(56) References Cited

U.S. PATENT DOCUMENTS

2011/0001959 A1* 1/2011 Hasegawa .................... 356/73.1
2011/0255860 A1* 10/2011 Lee et al. ....................... 398/12
2012/0045205 A1* 2/2012 Perron ........................... 398/48

FOREIGN PATENT DOCUMENTS

| | | |
|---|---|---|
| CN | 1855775 | 11/2006 |
| CN | 1866790 | 11/2006 |
| CN | 1980094 | 6/2007 |
| CN | 101141411 | 3/2008 |
| CN | 101304283 | 11/2008 |
| EP | 0 622 912 A1 | 11/1994 |
| JP | 2009-25211 | 2/2009 |
| JP | 2009-63377 | 3/2009 |
| WO | WO 2009/129647 A1 | 10/2009 |
| WO | WO 2010/043056 A1 | 4/2010 |

OTHER PUBLICATIONS

Supplementary European Search Report dated Oct. 24, 2012 in connection with European Patent Application No. EP 11 78 0134.
Written Opinion of the International Searching Authority dated Aug. 11, 2011 in connection with International Patent Application No. PCT/CN2011/073355.
K. Yuksel et al., "Centralised Optical Monitoring of Tree-structured Passive Optical Networks using a Raman-assisted OTDR", IEEE, Jul. 1, 2007, p. 175-178.
PCT International Search Report mailed Aug. 11, 2011, issued in related International Application No. PCT/CN2011/073355, Huawei Technologies Co., Ltd. (4 pages).

* cited by examiner

METHOD AND APPARATUS FOR DETECTING BRANCH FIBERS, AND PASSIVE OPTICAL NETWORK

CROSS-REFERENCE TO RELATED APPLICATIONS

This application is a continuation of International Application No. PCT/CN2011/073355, filed on Apr. 27, 2011, which claims priority to Chinese Patent Application No. 201010170195.6, filed on May 11, 2010, both of which are hereby incorporated by reference in their entireties.

FIELD OF TILE DISCLOSURE

The present disclosure relates to passive optical network technologies, and in particular, to a method and an apparatus for detecting branch fibers, and a passive optical network system.

BACKGROUND OF THE DISCLOSURE

In a PON (Passive Optical Network) based on P2MP architecture, a communication device located in a central office, such as an OLT (Optical Line Terminal), receives information reported from multiple user side devices, such as multiple ONUs (Optical Network Units), in a time division multiple access (TDMA) mode.

When the physical optical channel corresponding to each branch fiber is tested, a test device in the central office receives multiple test signals returned from different ONUs. However, the test signals generally do not carry information for identifying the corresponding branch fiber. Therefore, after receiving the multiple test signals, the test device cannot distinguish the specific branch fiber from which each test signal comes.

In view of the above problem, a method for identifying a test signal in the existing techniques is as follows: at the time of constructing a PON network, the branch fibers are ensured to have different lengths; after receiving a test signal from a branch fiber, the test device obtains a length of the branch fiber according to a transmission duration of the test signal in the branch fiber, and identifies the specific branch fiber from which the test signal comes according to the length of the branch fiber. However, this method for identifying the test signal requires that branch fibers to have different lengths at the time of network constructing the PON, which increases the difficulty of implementation.

Another method for identifying the test signal is as follows: test signals with different wavelengths are distributed for different branch fibers, and the test device identifies the specific branch fiber from which each test signal comes according to the wavelength of the received test signal. However, since the test signals are normally provided by the test device in the central office, in order to send the test signals with different wavelengths, this method has a high requirement on a tunable laser in the test device such as an OTDR (Optical Time Domain Reflectometer) in the central office, thus a cost for implementing this method is high.

SUMMARY OF THE DISCLOSURE

To overcome the foregoing technical problems, embodiments of the present disclosure provide a method and an apparatus for detecting branch fibers, and a passive optical network system that apply the method for detecting branch fibers.

The embodiments of the present disclosure disclose the following technical solutions. A method for detecting branch fibers is applied in a point-to-multipoint optical network, the optical network includes an optical splitting module and a plurality of branch fibers respectively connected to different ports of the optical splitting module. The method includes: sending test signals to the branch fibers, where the test signals are added at the ports of the optical splitting module with identification information for identifying branch fibers connected to the ports; and receiving a reflection signal added with the identification information of a detected branch fiber, identifying the detected branch fiber corresponding to the reflection signal through detecting the identification information added to the reflection signal, and obtaining channel characteristics of the detected branch fiber according to the reflection signal.

An apparatus for detecting branch fibers includes a test device, an optical splitting module and a plurality of branch fibers. The test device is connected to the branch fibers through the optical splitting module, and is configured to send test signals to the branch fibers respectively through the optical splitting module during branch fiber detection. The optical splitting module is configured to add identification information of the branch fibers to corresponding test signals through ports in the optical splitting module, and send the test signals to the corresponding branch fibers respectively. Moreover, the test device is further configured to receive a reflection signal added with the identification information of a detected branch fiber, identify the detected branch fiber corresponding to a reflection signal through detecting the identification information added to the reflection signal, and obtain channel characteristics of the detected branch fiber according to the reflection signal.

A passive optical network system includes an optical line terminal, an optical splitter, a test device, and a plurality of optical network units. The OLT is connected to the optical network units in a point-to-multipoint mode through the optical splitter. The test device may be configured to send test signals to physical channels of the optical network units through the optical splitter, where the test signals are respectively added at ports of the optical splitter with the identification information of the physical channels corresponding to the ports respectively. Moreover, the test device is further configured to receive a reflection signal added with the identification information of a detected physical channel, identify the detected physical channel corresponding to a reflection signal through identifying the identification information added to the reflection information, and obtain channel characteristics of the detected physical channel according to the reflection signal.

An optical splitter includes a network port and a plurality of user ports. The network port is configured to receive a test signal from a central office, where the test signal is a wide-spectrum signal with wavelengths covering a preset spectrum section, and the test signals are split into a plurality of test signals. The user ports are configured to selectively block frequency components corresponding to the branch fibers in the wide-spectrum section of the test signals so that the test signals are added with identification information for identifying the branch fibers respectively, and forward the test signal added with the identification information of the branch fibers to the corresponding branch fibers.

In the technical solutions of the present disclosure, the identification information corresponding to each branch fiber is added into a corresponding test signal at a port of the optical splitting module, so that the reflection signal of the test signal reflected from an end of the detected branch fiber is added with the identification information of the detected branch fiber. Therefore, the test device in the central office can directly identify the detected branch fiber corresponding to the reflection signal, and obtain the channel characteristics of the detected branch fiber according to the reflection signal. In this way, in the technical solutions of the present disclosure, the branch fibers do not necessarily have different lengths, and do not necessarily use different test wavelengths; instead, a normal test device can be used to detect the branch fibers. Therefore, the implementation of detection of the branch fibers is simple, convenient, and has a low cost.

BRIEF DESCRIPTION OF THE DRAWINGS

To make the technical solution of the present disclosure or in the existing techniques clearer, the following outlines the accompanying drawings involved in the description of the embodiments of the present disclosure or the existing techniques. Apparently, the accompanying drawings outlined below are illustrative rather than exhaustive, and a person of ordinary skill in the art can derive other drawings from them without any creative effort.

DETAILED DESCRIPTION OF THE EMBODIMENTS

To make the objectives, features and advantages of the present disclosure clearer, details of the embodiments of the present disclosure are described as follows with reference to accompanying drawings.

To solve the problems in the existing techniques, the embodiments of the present disclosure first provide a method for detecting branch fibers, which may be applied to a point-to-multipoint optical network (such as a passive optical network). The optical network may include an optical splitting module and a plurality of branch fibers connected to different ports of the optical splitting module respectively. Specifically, the method may include: first, a test device sends test signals to the branch fibers through the ports of the optical splitting module, where the test signals are respectively added, at the ports of the optical splitting module, with identification information for identifying the branch fibers connected to the ports, and a test signal corresponding to a detected branch fiber is reflected at an end of the detected branch fiber to form a reflection signal added with the identification information of the detected branch fiber, while other test signals corresponding to other branch fibers are absorbed at the corresponding branch fibers. Further, the test device may receive the reflection signal added with the identification information of the detected branch fiber, identify the detected branch fiber corresponding to the reflection signal through detecting the identification information added to the reflection signal, and obtain channel characteristics of the detected branch fiber according to the reflection signal.

In a specific embodiment, the test device may be an optical time domain reflectometry (OTDR) connected to the optical splitting module through a backbone fiber, and the OTDR may emit a wide-spectrum signal with the wavelengths covering a preset spectrum section and uses the wide-spectrum signal as the test signals. Moreover, the optical splitting module may be a stand-alone optical splitter. The optical splitter is configured to perform single-level optical splitting on the wide-spectrum signal received from the central office to form multiple test signals, and provide the test signals to the branch fibers respectively; or, the optical splitting module may include multiple optical splitters connected in a tree mode to perform 2-level and multi-level optical splitting on the wide-spectrum signal received from the central office to form multiple test signals, and provide the test signals to the branch fibers respectively.

Further, in an embodiment, the identification information is added by the optical splitting module to the test signals by marking the frequency component respectively corresponding to each branch fiber in the wide-spectrum test signals. For example, the preset spectrum section is defined with N frequency components specially for identifying the branch fibers, and each frequency component is defined as a binary code "1" or "0", depending on whether the frequency component is blocked. The N frequency components together define one N-bit binary code which is used as identification information of the branch fibers. The N-bit binary codes with different coding values correspond to different branch fibers respectively. Moreover, the N frequency components of the test signals are selectively blocked at the port connected to the detected branch fiber in the optical splitting module, and then the test signal is added with the N-bit binary code with a coding value corresponding to the detected branch fiber.

Further, in an embodiment, a reflector is disposed at the end of each branch fiber, and the reflector is coupled to the corresponding branch fiber through an optical switch. Before the test signal is sent, the optical switch corresponding to the detected branch fiber connects an optical path between the detected branch fiber and the reflector, so that the test signal added with the identification information of the detected branch fiber is reflected by the reflector to form the reflection signal when the test signal is sent to the reflector connected to the detected branch fiber.

In addition, an embodiment of the present disclosure further provides a system for detecting branch fibers, which includes a test device, an optical splitting module, and multiple branch fibers. The test device is connected to the multiple branch fibers through the optical splitting module. The test device may be configured to send test signals to the multiple branch fibers through the optical splitting module during detection of the branch fibers. The optical splitting module is configured to add identification information of each branch fiber to the corresponding test signal through each port therein, and send the test signals to the corresponding branch fibers respectively, where a test signal are reflected at the detected branch fiber while other test signals are absorbed at other branch fibers. Moreover, the test device may be further configured to identify the detected branch fiber corresponding to the reflection signal through detecting the identification information added to the reflection signal, and obtain channel characteristics of the detected branch fiber according to the reflection signal.

To enable better understanding of the method and the system for detecting branch fibers, an exemplary embodiment is given in the following to describe the technical solution of the present disclosure.

Embodiment 1

Figure 1:
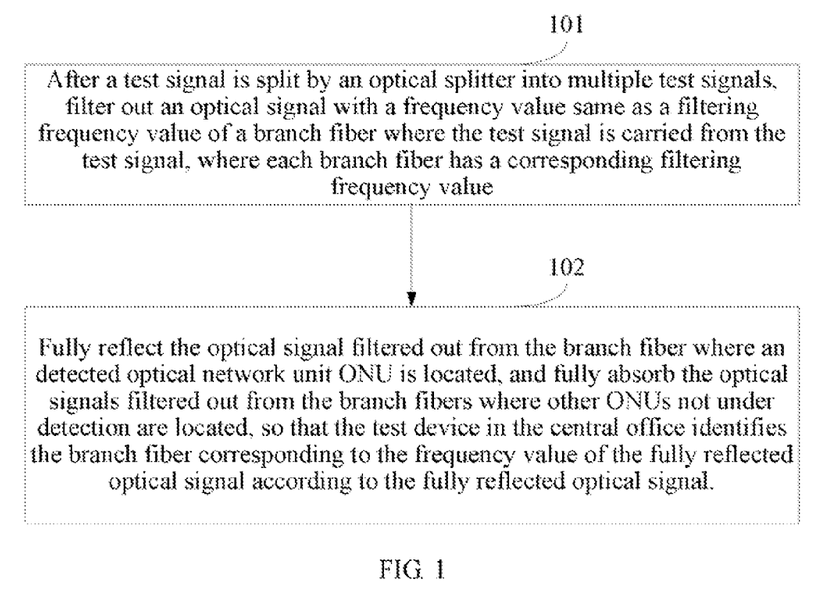
FIG. 1 is a flowchart of a method for detecting branch fibers according to an embodiment of the present disclosure.

FIG. 1 is a flowchart of a method for detecting branch fibers according to an embodiment of the present disclosure. The method includes the following steps.

Step 101: After a test signal is split by an optical splitter into multiple test signals, filter out an optical signal with a frequency value same as a filtering frequency value of a branch fiber where the test signal is carried from the test signal, where each branch fiber has a corresponding filtering frequency value.

For example, in a PON system with a split ratio of 1:32, after a test signal is split by the optical splitter, 32 test signals are obtained and are then carried by 32 branch fibers respectively, and each branch fiber has a corresponding screening frequency value. In a specific embodiment, in this step, an optical signal with a filtering frequency value same as that of a branch fiber where test signal is carried is filtered out from the 32 test signals.

The filtering frequency value is a frequency value corresponding to a binary code "1" or a binary code "0" in a channel identifier of the branch fiber. Each branch fiber has a channel identifier different from each other, and each bit of the channel identifier has a corresponding frequency value.

For example, for 32 branch fibers, 5-bit binary code may be used as a channel identifier of the branch fiber. Therefore, the channel identifier of a first branch fiber is 00000, the channel identifier of a second branch fiber is 00001 . . . , and the channel identifier of a 32nd branch fiber is 11111.

Definitely, the embodiment of the present disclosure is not limited to the 5-bit binary code used as the channel identifier of the branch fiber. A binary code of more than 5 bits may be alternatively used in addition to the 5-bit binary code as the channel identifier of the branch fiber. For example, 7-bit binary code may be used. In the 7-bit binary code, the last 5 bits are used as the channel identifier, and the previous 2 bits are used as extension bits. When the number of the branch fibers is extended in the PON system, two extension bits can be used to increase the number of the channel identifiers.

After the channel identifiers are assigned to the branch fibers, a corresponding frequency value is set for each bit in the channel identifier. Here, although 32 channel identifiers are assigned to 32 branch fibers, if a 5-bit channel identifier is used, each channel identifier includes a 5-bit binary code, and therefore, 5 frequency values corresponding to the bits respectively are set. For example, the 5 frequency values set for the 5-bit binary code b4, b3, b2, b1, and b0 are respectively f4, f3, f2, f1, and f0. The filtering frequency value is a frequency value corresponding to a binary code "1" or a binary code "0" in the channel identifier. For example, if a channel identifier is 10000 and the filtering frequency value is set to a frequency value corresponding to a binary code of "1", f4 is the filtering frequency value. Similarly, if the screening frequency value is set to a frequency value corresponding to a binary code "0", f3, f2, f1, and f0 are the filtering frequency values. It can be seen from the above description that the filtering frequency value in the branch fiber is not necessarily a single frequency value; the filtering frequency value may alternatively be set as frequency values composed of multiple frequency values.

It should be noted that, the five frequency values f4, f3, f2, f1, and f0 set for the 5-bit binary nodes b4, b3, b2, b1, and b0 are selected from a spectrum range of the test signal. The embodiment of the present disclosure does not restrict the specific values of the five frequencies values f4, f3, f2, f1, and f0.

In addition, it should be further noted that, for the first branch fiber whose channel identifier is 00000, if the filtering frequency is the frequency value corresponding to a binary code "1" in the channel identifier of the branch fiber, since the channel identifier 00000 has no binary code "1", the branch fiber has no filtering frequency, and no optical signal with the frequency same as the filtering frequency value of the branch fiber where the test signal is carried can be filtered out. In this case, the test signal on this branch fiber may be unidentifiable to the test device. Therefore, in actual application, the branch fiber whose channel identifier is 00000 may be reserved for future use, that is, the branch fiber whose channel identifier is 00000 may be vacated and not be used.

In addition, the step of filtering out the optical signal with the frequency same as the filtering frequency value of the branch fiber where the test signal is carried from the test signals includes: transparently transmitting the optical signal with the frequency same as the filtering frequency value of the branch fiber where test signal is carried in the test signals, and blocking the optical signals with the frequencies different from the filtering frequency value of the physical optical channel branch where the test signal is carried in the test signals, namely, selectively blocking the frequency components in the test signals; alternatively, in other embodiments, blocking the optical signal with the frequency same as the filtering frequency value in the test signals, and transparently transmitting the signals with other frequency values.

For example, among the five frequency values f4, f3, f2, f1, and f0 corresponding to the 5-bit binary nodes b4, b3, b2, b1, and b0, if f4 is a filtering frequency value, the optical signal corresponding to the filtering frequency value f4 in the test signals is transmitted transparently, and the optical signals corresponding to non-filtering frequency values f3, f2, f1, and f0 in the test signals are blocked; or, the optical signal corresponding to the filtering frequency value f4 in the test signals is blocked, and the optical signals corresponding to non-filtering frequency values f3, f2, f1, and f0 are transmitted transparently.

In the embodiment of the present disclosure, FBGs (Fiber Bragg Gratings) or coating films or filters can be applied to filtering out the optical signal with the frequency same as the filtering frequency value of the branch fiber where the test signal is carried from the test signals.

Step 102: Fully reflect the optical signal filtered out from the branch fiber where an detected optical network unit ONU is located, and fully absorb the optical signals filtered out from the branch fibers where other ONUs not under detection are located, so that the test device in the central office identifies the branch fiber corresponding to the frequency value of the fully reflected optical signal according to the fully reflected optical signal.

The step of fully reflecting the optical signal filtered out from the branch fiber where the detected optical network unit ONU is located and fully absorbing the optical signals filtered out from other branch fibers where the ONUs non under detection are located includes: receiving a control command sent by the test device in the central office, where the control command is configured to controls optical switches to execute full reflection or full absorption; controlling an optical switch to fully reflect the optical signal filtered out from the branch fiber where the detected ONU is located, and controlling other optical switches to fully absorb the optical signals filtered out from the branch fibers where the ONUs, which are not under detection, are located according to the control commands.

For example, a test device in the central office sends a control command for controlling the optical switches to execute full reflection or full absorption, the control command controls an optical switch to fully reflect the optical signal filtered out from the branch fiber where the detected ONU is located, and controls other optical switches to fully absorb the optical signals filtered out from the branch fibers where the ONUs not under detection are located. For example, in 32 ONUs, if the second ONU is set as a detected ONU and the second ONU is located at the second branch fiber, the control command controls an optical switch to fully reflect the optical signal filtered out from the second branch fiber where the second ONU is located, and controls other switches to fully absorb the optical signals filtered out from other branch fibers than the second branch fiber.

If the filtering frequency value is a frequency value corresponding to a binary code "1" or a binary code "0" in the channel identifier of the branch fiber, the step of in the central office identifies the branch fiber corresponding to the frequency value of the fully reflected optical signal according to the fully reflected optical signal includes: the test device in the central office detects a bit corresponding to the frequency value of the fully reflected optical signal according to the fully reflected optical signal, and obtains the channel identifier of the branch fiber where the detected ONU is located according to the detected bit.

For example, an ONU is set as a detected ONU, and the detected ONU is located at the second branch fiber, and the channel identifier of the second branch fiber is 00001. According to the definition of the filtering frequency value, the filtering frequency value is a frequency value corresponding to a binary code "1" in the channel identifier of the branch fiber. Therefore, among the five frequency values f4, f3, f2, f1, and f0 corresponding to the 5-bit binary codes b4, b3, b2, b1, and b0, f0 is the filtering frequency value for the second branch fiber. The optical signal corresponding to the filtering frequency f0 among the test signal is transmitted transparently; and under control of the control command, the optical switch fully reflects the optical signal whose filtering frequency is f0 at the second branch fiber where the second ONU is located. After receiving the fully reflected optical signal, the test device in the central office identifies that the bit corresponding to the frequency value f0 is b0 according to the frequency f0 of the fully reflected optical signal. Therefore, the channel identifier of the branch fiber where the detected ONU is located is 00001, namely, the test signal comes from the ONU on the second branch fiber.

It can be seen from the foregoing embodiment that, after the test signal are split by the optical splitter to form multiple test signals, the optical signal with frequency same as the filtering frequency value of the branch fiber where the test signal is carried is filtered out from the test signals, where each branch fiber has a corresponding filtering frequency value. Afterwards, the optical signal filtered out from the branch fiber where the detected ONU is located is fully reflected, and the optical signals filtered out from other the branch fibers are fully absorbed. It can be seen that, after the test signals are processed in the foregoing manner, when an optical terminal device receives the fully reflected optical signals, the optical terminal device can identify the branch fiber corresponding to the frequency value of the fully reflected optical signal according to the fully reflected optical signal. Therefore, the branch fiber from which the test signal comes can be identified without the need to set different wavelengths for test signals on different branch fibers, and thus the implementation is easier.

Embodiment 2

Based on the method and system for detecting branch fibers, an embodiment of the present disclosure further provides a passive optical network that applies the method and the system for detecting branch fibers. Specifically, the passive optical network system includes an optical line terminal, an optical distribution network, and a plurality of optical network units. The optical line terminal is connected to the optical network units in a point-to-multipoint manner through the optical distribution network. The passive optical network system further includes: a test device (such as an OTDR) that is configured to send test signals to physical channels of the optical network units through the optical splitter, where the test signals are respectively added, at the ports of the optical splitter, with identification information of the physical channels corresponding to the ports, and a test signal is reflected on a detected physical channel to form a reflection signal added with the identification information of the detected physical channel, and the test signals on other physical channels are absorbed. Moreover, the test device is further configured to identify a physical channel corresponding to the reflection signal through detecting the identification information added to the reflection signal, and obtain channel characteristics of the physical channel according to the reflection signal.

In a specific embodiment, a reflector is connected to each of physical channels corresponding to the optical network units, and the reflector is coupled to the corresponding physical channel through an optical switch. Before the test device sends a test signal, the optical line terminal sends a remote command to the optical network units to instruct the optical network units to control on/off state of each of the optical switches corresponding to the physical channels, so as to connect an optical path between the detected physical channel and the corresponding reflector, and disconnect optical paths between other physical channels and the corresponding reflectors.

Further, in an embodiment, the test signal sent by the test device is a wide-spectrum signal with wavelengths covering a preset spectrum section, and the preset spectrum section is defined with N frequency components specially for identifying the physical channels in advance. Each frequency component is defined as a binary code "1" or "0", depending on whether the frequency component is blocked. The N frequency components together define an N-bit binary code. The N-bit binary code serves as identification information of the physical channel, and N-bit binary codes with different binary values correspond to different physical channels respectively. Through an optical splitter port corresponding to the detected physical channel in the optical distribution network, the optical distribution network selectively blocks the N frequency components in the test signal, so as to add the N-bit binary code with the binary values corresponding to the detected physical channel into the test signal.

Figure 2:
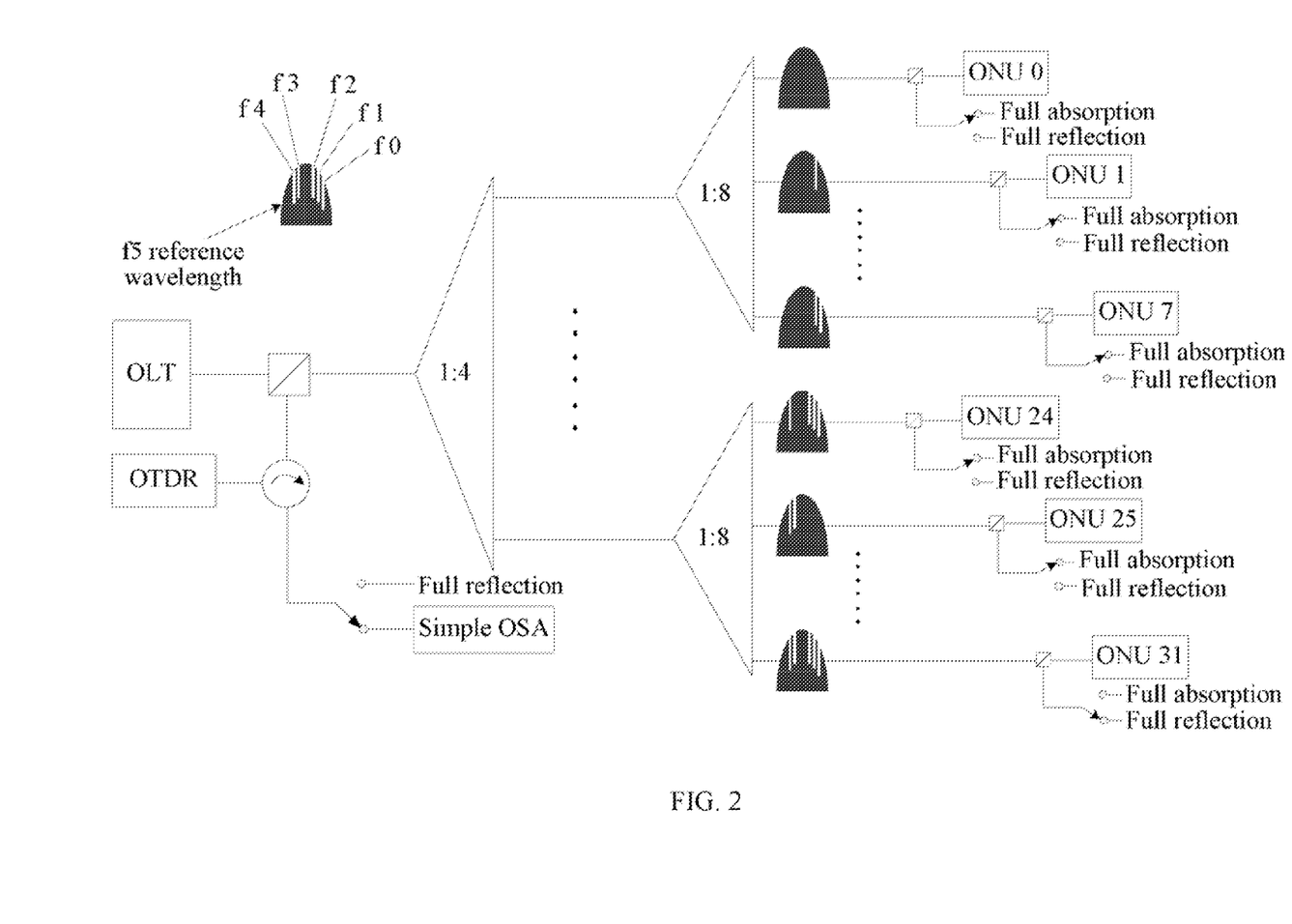
FIG. 2 is a schematic diagram of a scenario of a PON system capable of 2-level optical splitting according to the present disclosure.

To better understand the passive optical network provided by the embodiment of the present disclosure, a passive optical network capable of 2-level splitting at a split ratio of 1:32 is provided as a specific application scenario for detailed description with reference to FIG. 2.

FIG. 2 is a schematic diagram of a scenario of a PON system capable of 2-level splitting according to the present disclosure. In this scenario, the split ratio is 1:32. As shown in FIG. 2, an optical switch is connected to an end of a fiber via a WDM (Wavelength Division Multiplexing) unit. Under control of a control command, the optical switch is in either of the two states: fully reflecting the optical signal or fully absorbing the optical signal. Different channel identifiers are set for different branch fibers, and a corresponding frequency value is set for each bit of the channel identifier. The frequency value corresponding to a binary code "1" in the channel identifier of the branch fiber is set as a filtering frequency value of the branch fiber.

Figure 3:
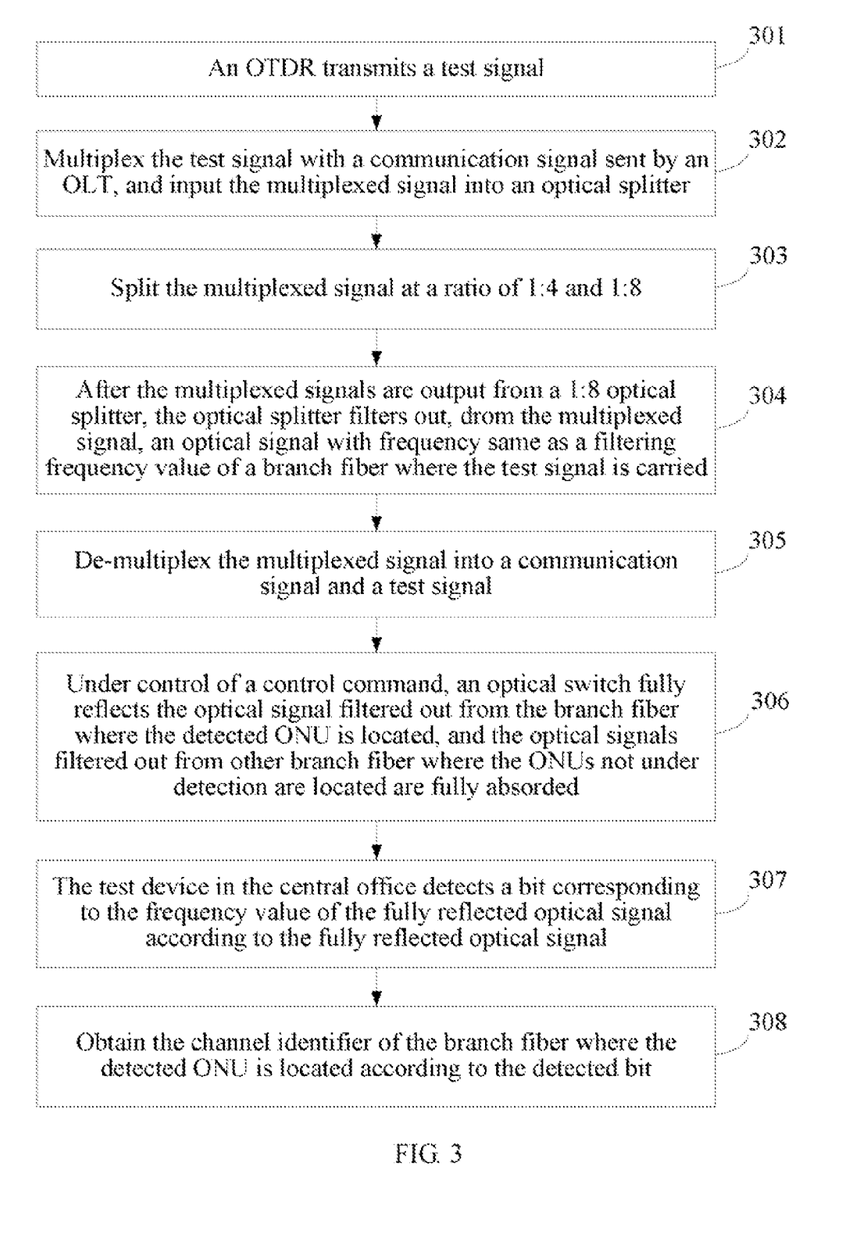
FIG. 3 is a flowchart of a method for detecting branch fibers according to another embodiment of the present disclosure.

As for the application scenario shown in FIG. 2, referring to FIG. 3, a flowchart of another embodiment of a method for detecting branch fibers according to the present disclosure is shown. The method includes the following steps.

Step 301: An OTDR (Optical Time Domain Reflectometer) transmits a test signal.

Step 302: Multiplex the test signal with a communication signal sent by an OLT, and input the multiplexed signal into an optical splitter.

Step 303: Split the multiplexed signal at a ratio of 1:4 and 1:8.

Step 304: After the multiplexed signals are output from a 1:8 optical splitter, the optical splitter filters out an optical signal with frequency same as a filtering frequency value of a branch fiber where the test signal is carried from the multiplexed signal.

Here, the multiplexed signal output from the optical splitter includes the test signal and the communication signal, and a spectrum range of the test signal is different from that of the communication signal, and thereby the test signal does not overlap a spectrum scope of the communication signal. Therefore, an optical splitter can filter out the optical signal with frequency same as the filtering frequency value of the branch fiber where the test signal is carried from the multiplexed signal.

In this embodiment, a frequency value corresponding to a binary node "1" in the channel identifier of the branch fiber is set as the filtering frequency value of the branch fiber.

Details of the filtering method have been described in Embodiment One above, and thus are not described herein again.

Step 305: De-multiplex the multiplexed signal into a communication signal and a test signal.

Step 306: Under control of a control command, an optical switch fully reflects the optical signal filtered out from the branch fiber where the detected ONU is located, and the optical signals filtered out from other branch fiber where the ONUs not under detection are located are fully absorbed.

For example, as shown in FIG. 2, in ONU0-ONU31, if the detected ONU is ONU1, the optical switch for ONU1 fully reflects the optical signal under control of the control command, and the optical switches for other ONUs fully absorbs the optical signals under control of the control command.

Step 307: The test device in the central office detects a bit corresponding to the frequency value of the fully reflected optical signal according to the fully reflected optical signal.

Step 308: Obtain the channel identifier of the branch fiber where the detected ONU is located according to the detected bit.

For example, a certain ONU is set as a detected ONU, the detected ONU is located at the second branch fiber, and the channel identifier of the second branch fiber is 00001. According to the definition of the filtering frequency value, the filtering frequency value is a frequency value corresponding to a binary node "1" in the channel identifier of the branch fiber. Therefore, among 5 frequency values f4, f3, f2, f1 and f0 set for the 5-bit binary codes b4, b3, b2, b1 and b0, f0 is the filtering frequency value for the second branch fiber. The optical signal corresponding to the filtering frequency f0 among the test signal is transmitted transparently; under control of the control command, the optical switch fully reflects the optical signal whose filtering frequency is f0 on the second branch fiber where the second ONU is located. After receiving the fully reflected optical signal, the test device identifies the bit corresponding to the frequency value f0 is the bit "b0" according to the fully reflected optical signal. Therefore, the channel identifier of the branch fiber where the detected ONU is located is 00001, namely, the test signal comes from the ONU at the second branch fiber.

It can be seen from the foregoing embodiment that, after the test signal are split by the optical splitter, the optical signals with the frequency same as the filtering frequency value of the branch fiber where the test signal is carried are filtered out from the test signal, where each branch fiber has a corresponding filtering frequency value. Afterwards, the optical switch fully reflects the optical signal filtered out from the branch fiber where the detected ONU is located, and other optical switches fully absorb the optical signals filtered out from the branch fibers where the ONUs not under detection are located. It can be seen that, after the test signal are processed in the foregoing manner, when an optical terminal device receives the fully reflected optical signal, the optical terminal identifies the identifier of the physical optical channel corresponding to the frequency value of the fully reflected optical signal and the corresponding physical parameters according to the fully reflected optical signal. Therefore, the terminal can identify the branch fiber from which the test signal comes without the need to set different wavelengths for test signals on different branch fibers, and thus the implementation is easier.

Embodiment 3

Figure 4:
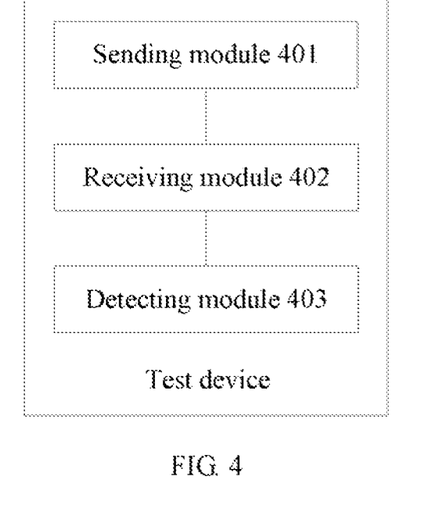
FIG. 4 is a structure diagram of a device for detecting branch fibers according to an embodiment of the present disclosure.

Corresponding to the method for detecting branch fibers, an embodiment of the present disclosure further provides a test device for detecting the branch fibers. As shown in FIG. 4, the test device provided by the embodiment of the present disclosure includes:

a test device 401, configured to send test signals to a plurality of branch fibers, where the test signals may be respectively added with identification information for identifying branch fibers connected to the ports during the test signals are transmitted to the branch fibers, and a test signal corresponding to a detected branch fiber is reflected at an end of the detected branch fiber to form a reflection signal added with the identification information of the detected branch fiber, and other test signals corresponding to other branch fibers are absorbed at the corresponding branch fibers;

a receiving module 402, configured to receive the reflection signal added with the identification information of the detected branch fiber; and a detecting module 403, configured to identify the detected branch fiber corresponding to the reflection signal through detecting the identification information added to the reflection signal; and obtain channel characteristics of the detected branch fiber according to the reflection signal.

Further, in a specific embodiment, the test signal is a widespectrum signal with wavelengths covering a preset spectrum section, and the identification information is added into the test signals by marking the frequency component respectively corresponding to each branch fiber in the wide-spectrum signal during the test signals are respectively transmitted to the branch fibers, where each frequency component may be marked by an optical splitter connected to the branch fibers.

The preset spectrum section is defined with N frequency components specially for identifying the branch fibers in advance, each frequency component is defined as a binary code "1" or "0", depending on whether the frequency component is blocked; the N frequency components together define a N-bit binary code, and the N-bit binary code is used as an identifier of the branch fiber. The N-bit binary code with different binary values corresponds to different branch fibers respectively. Moreover, the N frequency components of the test signal are selectively blocked at the optical splitter port connected to the detected branch fiber, and, in this way, the N-bit binary code with the binary value corresponding to the detected branch fiber is added into the test signal.

Embodiment 4

Figure 5:
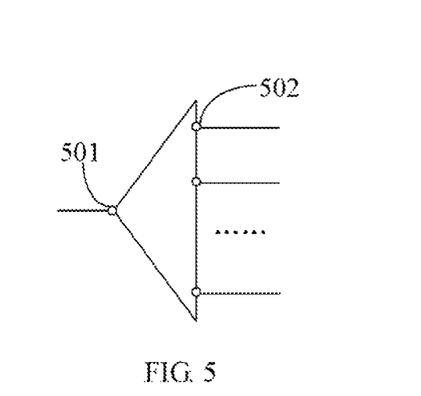
FIG. 5 is a structure diagram of an optical splitter device according to an embodiment of the present disclosure.

Based on the embodiments described above, an embodiment of the present disclosure further provides an optical splitter which may be applied to the method and system for detecting branch fibers. As shown in FIG. 5, the optical splitter provided by the embodiment of the present disclosure may include a network port 501 and a plurality of user ports 502.

The network port 501 is configured to receive a test signal from a central office, where the test signal is a wide-spectrum signal with wavelengths covering a preset spectrum section, and a test signal is split into multiple test signals.

The multiple user ports 502 are configured to selectively block frequency components corresponding to the branch fibers in the wide-spectrum section of the test signals so that the test signals are respectively added with identification information for identifying the branch fibers, and respectively forward the test signals added with the identification information of the branch fiber to the corresponding branch fibers, where a test signal corresponding to a detected branch fiber is reflected at an end of the detected branch fiber to form a reflection signal added with the identification information of the detected branch fiber, and other test signals are absorbed at the corresponding branch fibers respectively.

Persons of ordinary skill in the art should understand that all or part of the steps of the method provided in the embodiments above may be implemented by a program instructing relevant hardware. The program may be stored in computer readable storage media. When the program runs, the program executes the steps of the method specified in any embodiment above. The storage media may be a magnetic disk, CD-ROM, Read-Only Memory (Read-Only Memory, ROM), or Random Access Memory (Random Access Memory, RAM).

Disclosed above are a method and an apparatus for detecting branch fibers. Although the disclosure is described through some exemplary embodiments, the disclosure is not limited to such embodiments. It is apparent that those skilled in the art can make modifications and variations to the disclosure without departing from the spirit and scope of the disclosure. The disclosure is intended to cover the modifications and variations provided that they fall in the scope of protection defined by the following claims or their equivalents.

What is claimed is:

1. A method for detecting branch fibers in a point-to-multipoint optical network, wherein the optical network comprises an optical splitting module and a plurality of branch fibers connected to different ports of the optical splitting module respectively, the method comprising:

sending test signals to the branch fibers, wherein the test signals are respectively added, at the ports of the optical splitting module, with identification information for identifying the branch fibers connected to the ports;

receiving a reflection signal added with identification information of a detected branch fiber, identifying branch fiber corresponding to the reflection signal through detecting the identification information added to the reflection signal, and obtaining channel characteristics of the branch fiber according to the reflection signal;

wherein each of the test signals includes a wide-spectrum signal with wavelengths covering a preset spectrum section, and the identification information is added by the optical splitting module into the test signal by marking a frequency component corresponding to the branch fiber in the wide-spectrum signal; and wherein the preset spectrum section is pre-defined with N frequency components specially for identifying the branch fibers, and each frequency component is defined as a binary code "1" or "0" depending on whether the frequency component is blocked; the N frequency components together define an N-bit binary code, and the N-bit binary code is used as the identification information of the branch fiber; and N-bit binary codes with different binary values correspond to different branch fibers respectively.

2. The method for detecting branch fibers according to claim 1, wherein a test signal sent to the detected branch fiber is reflected at an end of the detected branch fiber to form the reflection signal added with the identification information of the detected branch fiber, and test signals sent to other branch fibers are absorbed at the corresponding branch fibers.

3. The method for detecting branch fibers according to claim 1, wherein the N frequency components of the test signal are selectively blocked at a port connected to the detected branch fiber in the optical splitting module, so that the test signal is added with an N-bit binary code of a code value corresponding to the detected branch fiber.

4. The method for detecting branch fibers according to claim 1, wherein a filtering module is set at the port of the optical splitter, and the filtering module blocks the frequency component defined as "1" in the N-bit binary code corresponding to the branch fiber in the test signal, and transmits other frequency components transparently.

5. The method for detecting branch fibers according to claim 1, wherein a reflector is set at an end of each branch fiber, and the reflector is coupled to the corresponding branch fiber through an optical switch; wherein the optical switch corresponding to the detected branch fiber connects an optical path between the detected branch fiber and the reflector before the test signal is sent, so that when the test signal added with the identification information of the detected branch fiber is sent to the reflector connected to the detected branch fiber, the test signal is reflected by the reflector to form the reflection signal.

6. An apparatus for detecting branch fibers, comprising a test device, an optical splitting module and a plurality of branch fibers, wherein:

the test device is connected to the branch fibers through the optical splitting module;

the test device is configured to send test signals to the branch fibers respectively through the optical splitting module during branch fiber detection;

the optical splitting module is configured to add identification information of the branch fibers respectively into the test signals through ports of the optical splitting module, and send the test signals to the branch fibers respectively;

the test device is further configured to receive a reflection signal added with the identification information of a detected branch fiber, identify the detected branch fiber corresponding to the reflection signal according to the identification information added to the reflection signal, and obtain channel characteristics of the detected branch fiber according to the reflection signal;

wherein each of the test signals sent by the test device is a wide-spectrum signal with wavelengths covering a preset spectrum section, the identifier is added by the optical splitting module into the test signal by marking a frequency component corresponding to the branch fiber in the wide-spectrum signal, and each branch fiber corresponds to a set of frequency components; and wherein the preset spectrum section is pre-defined with N frequency components specially for identifying the branch fibers, and each frequency component is defined as a binary code "1" or "0" depending on whether the frequency component is blocked; the N frequency components together define an N-bit binary code, and the N-bit binary code is used as the identification information of the branch fiber; and N-bit binary codes with different binary values correspond to different branch fibers respectively.

7. The apparatus for detecting branch fibers according to claim 6, wherein a reflector is located at an end of each branch fiber, and the reflector is coupled to the corresponding branch fiber through an optical switch; wherein the optical switch corresponding to the detected branch fiber connects an optical path between the detected branch fiber and the reflector during the branch fiber detection, so that the reflector reflects the test signal transmitted through the detected branch fiber and added with the identification information of the detected branch fiber to form the reflection signal.

8. The apparatus for detecting branch fibers according to claim 6, wherein the optical splitting module selectively blocks the N frequency components in the test signal at the port connected to the detected branch fiber, so as to add the N-bit binary code with a binary value corresponding to the detected branch fiber into the test signal.

9. The apparatus for detecting branch fibers according to claim 8, wherein the N frequency components are selectively blocked by a coating film, a fiber bragg grating (FBG) or a filter at the port of the optical splitting module.

10. A passive optical network system, comprising an optical line terminal, an optical splitter, and a plurality of optical network units (ONU), wherein the optical line terminal is connected to the optical network units in a point-to-multipoint mode throe h the optical splitter, and the passive optical network system further comprises:

a test device, configured to send test signals to physical channels where the ONUs are located through the optical splitter, wherein the test signals are added, at ports of the optical splitter, with identification information of the physical channels corresponding to the ports respectively; and the test device is further configured to receive a reflection signal added with the identification information of a detected physical channel, identify the detected physical channel corresponding to the reflection signal through detecting the identification information added to the reflection signal, and obtain channel characteristics of the detected physical channel according to the reflection; signal;

wherein each of the test signals sent by the test device is a wide-spectrum signal with wavelengths covering a preset spectrum section, and the preset spectrum section is pre-defined with N frequency components specially for identifying the physical channels; each frequency component is defined as binary code "1" or "0" depending on whether the frequency component is blocked; and the N frequency components together define an N-bit binary code; the N-bit binary code serves as the identification information of the physical channel, and N-bit binary codes with different binary values corresponds to different physical channels respectively;

the optical splitter selectively blocks the N frequency components in the test signals through different ports of the optical splitter, so as to add the N-bit binary code with a binary value corresponding to the detected physical channel to be detected into a test signal.

11. The passive optical network system according to claim 10, wherein a test signal on the detected physical channel is reflected to form a reflection signal added with the identification information of the detected physical channel, and the test signals on other physical channels are absorbed.

12. The passive optical network system according to claim 10, wherein reflectors are respectively connected to the physical channels corresponding to the optical network units, and each reflector is coupled to a corresponding physical channel through an optical switch; and the optical line terminal sends a remote command to the optical network units before the test device sends a test signal, to instruct the optical network units to control a state of the optical switch corresponding to each physical channel, so as to connect an optical path between the detected physical channel and the corresponding reflector, and disconnect optical paths between other physical channels and the corresponding reflectors.

\* \* \* \* \*